US008144151B2

(12) United States Patent
Malnati et al.

(10) Patent No.: US 8,144,151 B2
(45) Date of Patent: Mar. 27, 2012

(54) SPATIAL AND TEMPORAL GRAPHICAL DISPLAY OF VERIFIED/VALIDATED DATA ORGANIZED AS COMPLEX EVENTS

(75) Inventors: Stefano Malnati, La Jolla, CA (US); Aleksandr Rudenko, Tallinn (EE); Andrel Zhovjev, Tallinn (EE); Jeff Davis, Colorado Springs, CO (US)

(73) Assignee: HireRight, Inc., Irvine, CA (US)

( * ) Notice: Subject to any disclaimer, the term of this patent is extended or adjusted under 35 U.S.C. 154(b) by 886 days.

(21) Appl. No.: 11/580,037

(22) Filed: Oct. 3, 2006

(65) Prior Publication Data
US 2008/0077887 A1  Mar. 27, 2008

Related U.S. Application Data

(60) Provisional application No. 60/799,261, filed on May 10, 2006.

(51) Int. Cl.
*G06T 11/20* (2006.01)
*G06F 3/00* (2006.01)
*G06F 3/048* (2006.01)

(52) U.S. Cl. .................. 345/440; 715/700; 715/764
(58) Field of Classification Search .............. 345/440; 715/700, 764
See application file for complete search history.

(56) References Cited

U.S. PATENT DOCUMENTS

| 5,835,059 A * | 11/1998 | Nadel et al. ............... 342/398 |
| 5,877,766 A * | 3/1999 | Bates et al. ................ 715/854 |
| 6,081,764 A * | 6/2000 | Varon ......................... 701/120 |
| 6,141,767 A * | 10/2000 | Hu et al. ..................... 714/1 |
| 6,433,729 B1 * | 8/2002 | Staggs ........................ 342/29 |
| 2002/0075171 A1 * | 6/2002 | Kuntman et al. ............ 340/961 |
| 2005/0200501 A1 * | 9/2005 | Smith ......................... 340/963 |
| 2006/0058940 A1 * | 3/2006 | Kumagai et al. ............ 701/117 |
| 2006/0288288 A1 * | 12/2006 | Girgensohn et al. ........ 715/716 |
| 2007/0165642 A1 * | 7/2007 | Jones .......................... 370/392 |
| 2007/0174770 A1 * | 7/2007 | Safoutin ..................... 715/700 |
| 2008/0098068 A1 * | 4/2008 | Ebata ......................... 709/206 |

OTHER PUBLICATIONS

Plaisant et al.; LifeLines: Visualizing Personal Histories; Apr. 18, 1996; SIGCHI Conference on Human Factors in Computing Systems; pp. 221-227.*

* cited by examiner

Primary Examiner — Xiao M. Wu
Assistant Examiner — David T Welch
(74) Attorney, Agent, or Firm — Arnold & Porter LLP

(57) ABSTRACT

Complex events for an entity are gathered, each including an event, the event's location, and the date of the event. A map encompassing the locations of the complex events is displayed. The location of each complex event is denoted on the map, such as by an icon corresponding to the complex event type, in a color corresponding to whether the complex event was validated. For each successive pair of complex events, including a first and a second complex event, a line is drawn on the map between their locations. Timelines graphically denoting the complex events in order of their dates may be displayed, including one corresponding to those complex events that have been validated, and others that each correspond to those complex events that come from the same source. A list of the complex events may be displayed, organized in accordance with the types of the complex events.

27 Claims, 5 Drawing Sheets

FIG 4
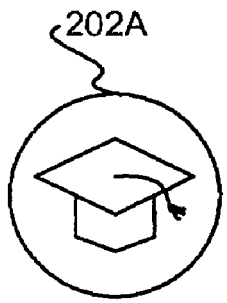
202A
September 1999 - May 2003
Big University
Bangalore, India
Bachelor's in Electrical Engineering
402A
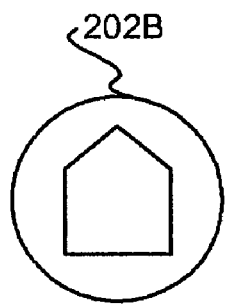
202B
June 2003 - August 2003
12345 Cherry Lane
London, England
402B
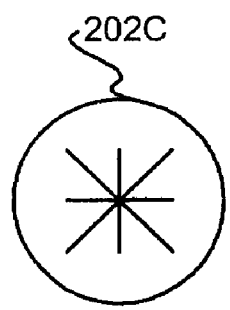
202C
August 2003 - May 2006
ABC Company
Palo Alto, Calif.
Technical Specialist
402C
400

SPATIAL AND TEMPORAL GRAPHICAL DISPLAY OF VERIFIED/VALIDATED DATA ORGANIZED AS COMPLEX EVENTS

RELATED APPLICATIONS

The present patent application claims priority to the provisional patent application entitled "Spatial temporal viewer for information obtained and verified during the information verification process," filed on May 10, 2006, and assigned Ser. No. 60/799261.

FIELD OF THE INVENTION

The present invention relates generally to displaying verified/validated data that is organized as complex events, and more particularly as a spatially and temporally graphical display of complex events.

BACKGROUND OF THE INVENTION

Organizations, such as companies, as well as individuals, are increasingly subject to background checks. For example, employers commonly perform background checks on prospective employees to ensure that the information they are providing on resumes and employment applications is truthful, and to locate other information regarding the prospective employees to secure a full picture of them. Background checks may be performed on organizations and individuals for other reasons as well.

However, getting a sense of an organization or individual based on the information that is gathered can prove to be difficult, especially where a large number of organizations and/or individuals are to be processed. Users typically process data visually better than they do by reading words on a page, and yet most background checks provide only textual viewing of the information collected regarding a given person or organization. As such, gaps within the background of a given organization or individual may be difficult to discern, or may be missed entirely.

Furthermore, existing approaches to visualize data are often not well suited for visualizing background check information. These approaches may not display the data in a way that is meaningful to a user who is performing a background check on an individual or organization. In addition, such approaches may not be interactive, and instead provide users with a static and passive display of information that is not optimally helpful. For these and other reasons, therefore, there is a need for the present invention.

SUMMARY OF THE INVENTION

The present invention relates to the spatial and temporal graphical display of complex events. A computerized method of one embodiment of the invention gathers a number of complex events regarding an entity from one or more sources. Each complex event represents a real situation that took place involving the entity, a location where the complex event took place, and a date & time-span during which the complex event occurred. A map is displayed on a display and that encompasses the locations of the complex events. For each complex event, the location thereof is denoted on the map on the display. The location may be denoted by an icon corresponding to the type of the event, in a color corresponding to whether the complex event has been validated or not. For each successive pair of complex events, including a first complex event and a second complex event, a line is drawn on the map as displayed on the display, between the location of the first complex event and the location of the second complex event to illustrate the time sequence of the complex events in the special dimension.

In one embodiment, the method may further include displaying on the display one or more timelines graphically denoting the complex events in the order of their dates of occurrence. One timeline may correspond to just those complex events that have been validated. Other timelines may each correspond to just those complex events that come from the same source. In one embodiment, the method further displays on the display a list of the complex events. The list may be organized in accordance with the types into which the complex events are categorizable. The entity to which the complex events relate may be an organization, such as a company, or an individual person.

The term "complex events" may be defined as specific situations taking place somewhere, sometime (time-span), and involving one or more entity (company and/or individual). Each complex event aggregates data provided by the entity, data extracted by documents provided by the entity (e.g. resume, on-line application), and validated/verified information (the result of the information validation process aimed to determine if the provided and/or extracted information are indeed corresponding to the truth).

A computerized system of one embodiment of the invention includes a display, a computer-readable medium, and logic. The computer-readable medium stores complex events regarding an entity gathered from one or more sources. Each complex event includes event-types specific information, a relation to the entity, a location of the event, and a date & time-span during which the event occurred. The complex event is also associated to the entity to which it relates. The logic is to display on the display the map, the lines, the timelines, and/or the list that has been described above. A computer-readable medium of one embodiment of the invention has a computer program stored thereon. The computer-readable medium is a tangible computer-readable medium, such as a recordable data storage medium, or another type of tangible computer-readable medium. The computer program is to perform the method that has been described.

Embodiments of the invention provide for advantages over the prior art. The approaches to visualization embodied by the invention are particularly suitable to displaying background information. For example, such information may include a number of complex events. Each complex event may represent an employment event, a residence event, an education event, as well as other types of complex events. Each complex event includes the relevant information depending upon the type of the complex event itself, such as the name of the employer, the location at which the event occurred, and the date during which the event occurred. For instance, an individual employed by ABC Company in San Francisco, Calif., from May 2001 through June 2003, may have a corresponding complex event, in which the event is "employment at ABC Company," the location is San Francisco, Calif., and the date is May 2001 through June 2003.

Displaying the complex events on a map, with lines between successive complex events in date order, is thus advantageous, because it provides the user with a graphical sense of the individual's employment history, residential history, missing information, gaps and so on. Discrepancies can easily be identified, such as an individual claiming to be employed by a company in one location, but where the individual lived far away during the same period of time. Denoting the locations of the complex events on the map with icons corresponding to the type of the complex events can allow a user to easily visually inspect an individual's education, residential, and employment histories. Having these icons displayed in different colors, depending on whether the complex events have been validated (e.g., verified), allows a user to easily see which complex events are validated and which are not.

A displayed timeline corresponding to the complex events that are validated allows a user to see how complete a verified history is provided of an individual or an organization. Displayed timelines corresponding to time-spans of complex events from different sources, such as tax records, an individual's employment application or resume, and so on, enable a user to easily determine whether the different sources provide the same picture of the individual. Finally, a list of the complex events themselves, organized by data type, enables a user to view more detailed information regarding the complex events.

All of these displays of complex events can be interactive. For instance, a user may be able to focus the map on a particular region in which an individual has a lot of complex events. Clicking on a type of complex event may cause a corresponding list of complex events to be displayed. Clicking and/or selecting on a given complex event within a timeline may cause the complex event to be highlighted on the map, and/or show the source of information from which the complex event was gathered. Still other aspects, embodiments, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4 is a diagram of a third representative display of information, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
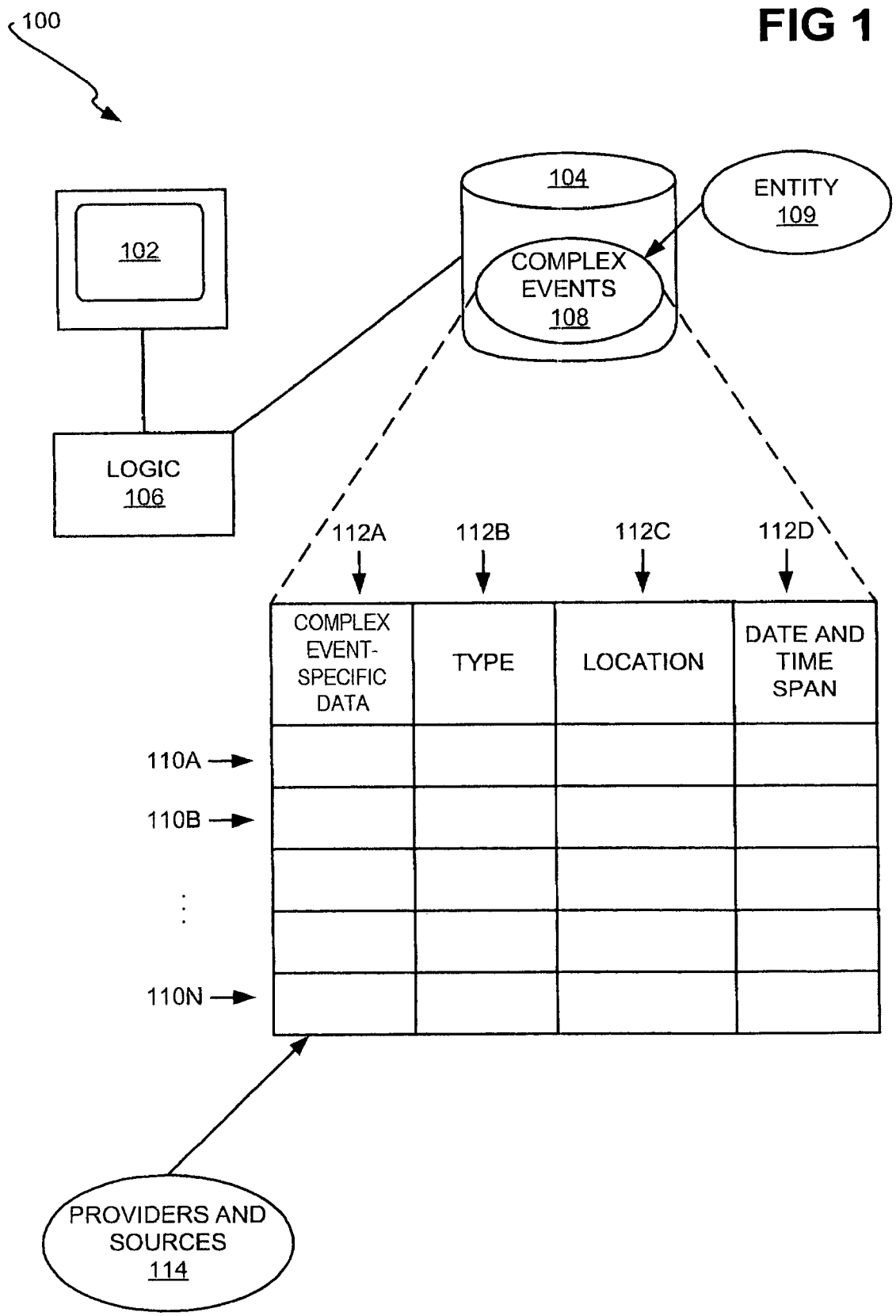
FIG. 1 is a diagram of a computerized system, according to an embodiment of the invention.

FIG. 1 shows a computerized system 100, according to an embodiment of the invention. The system 100 includes a display 102, a computer-readable medium 104, and logic 106. The system 100 may also include other components or parts, in addition to and/or in lieu of those depicted in FIG. 1. The display 102 may be a flat-screen display, a cathode-ray tube (CRT) display, or another type of display. The medium 104 may be a recordable data storage medium, such as a hard disk drive, or another type of tangible computer-readable medium. The logic 106 may be implemented in software, hardware, or a combination of hardware and software.

The computer-readable medium 104 stores a number of complex events 108. The complex events 108 may be stored as a table, including a number of rows 110A, 110B, ..., 110N, collectively referred to as the rows 110 and corresponding to the complex events 108, over a number of columns 112A, 112B, 112C, and 112D, collectively referred to as the columns 112. The columns 112 include different fields of the complex events 108. For instance, for each complex event, the event itself is stored, the type of the event is stored, the location of the event is stored, and the date during which the event occurred is stored. Other fields and other information may be stored as part of the complex events 108 as well, such as the source from which the complex event was collected, whether or not the complex event has been validated or verified, and so on.

In one embodiment, the complex events 108 relate to information collected from one or more providers and/or sources 114, and pertain to background check or screening for an entity 109, where the entity 109 may be an organization, like a company, or an individual person. Different complex events 108 may thus be gathered from different sources 114. The complex events 108 may include duplicative or redundant information, where more than one of the sources 114 reports the same information. The sources 114 may include tax records, an individual's resume or employment application, criminal records, as well as other publicly available and privately available records.

It is noted that whereas embodiments of the invention are substantially described in relation to a single entity 109, it is applicable to more than one entity. For instance, the various graphical viewing embodiments that are described later in the detailed description may relate to more than one entity, at the same time. These entities may be independent of one another, or related to each other.

The types of the complex events 108 as specified by the column 112B may include residential, employment, and educational, as well as other types of complex events. For instance, the residential type of complex event specifies that a complex event indicates an individual's home or residence. The employment type of complex event specifies that a complex event indicates an individual's employer or employment. The educational type of complex event specifies that a complex event indicates an individual's education or educational institution.

The event specific information of the complex events 108 as specified by the column 112A particularly denote the names of the complex events, as well as other complex event-specific data. For instance, for residential complex events, the names of the complex events may simply include the word "residence" or "home." However, for employment complex events, the names of the complex events may include the employer's names, such as "ABC Company," "Johnson and Smith Brothers," and so on. Similarly, for educational complex events, the names of the complex events may include the identities of the educational institutes, such as "Big State University," "Small Private College," and so on.

The locations of the complex events 108 as specified by the column 112C particularly denote the locations at which the complex events occur. For instance, a location may specify the address, city, state, and/or country at which a complex event occurs. An example location for a residential complex event may be "1234 Cherry Lane, Small City, Calif." An example location for an educational complex event may be "Pasadena, Calif." An example location for an employment complex event may be "Bangalore, India."

The dates of the complex events 108 as specified by the column 112D particularly denote the date during which the complex events occur, as well as other time span information. The date of a complex event is in actuality in range of dates in one embodiment. For instance, the date may specify when an individual has lived at a given location, such as "May 2000-April 2005." Similarly, the date may specify when an individual has worked for a given employer, such as "January 2001-February 2003." In general, the date of a complex event specifies at least year information, and may further specify month information, and for most particularity, may specify day information as well.

It is noted that the complex events 108 may be validated or not validated. Complex events originating from the individual him or herself may be considered initially not validated, until they are validated (i.e., verified) by a trusted source, such as tax records, and so on. Complex events originating from trusted sources themselves may be considered automatically validated. For example, tax records may inherently be trusted, such that any complex events that originate therefrom are automatically validated, and therefore are never not validated.

The logic 106 is to display the complex events 108 in a spatial and temporal manner on the display 102. Three different ways in which the complex events 108 may be displayed by the logic 106 are described in relation to FIGS. 2, 3, and 4. Each of these ways may be displayed in the same or different windows on the display 108 by the logic 106, at the same or different times. Differing embodiments of the invention can display the information in accordance with differing combinations of the manners depicted in and described in relation to FIGS. 2, 3, and 4.

Figure 2:
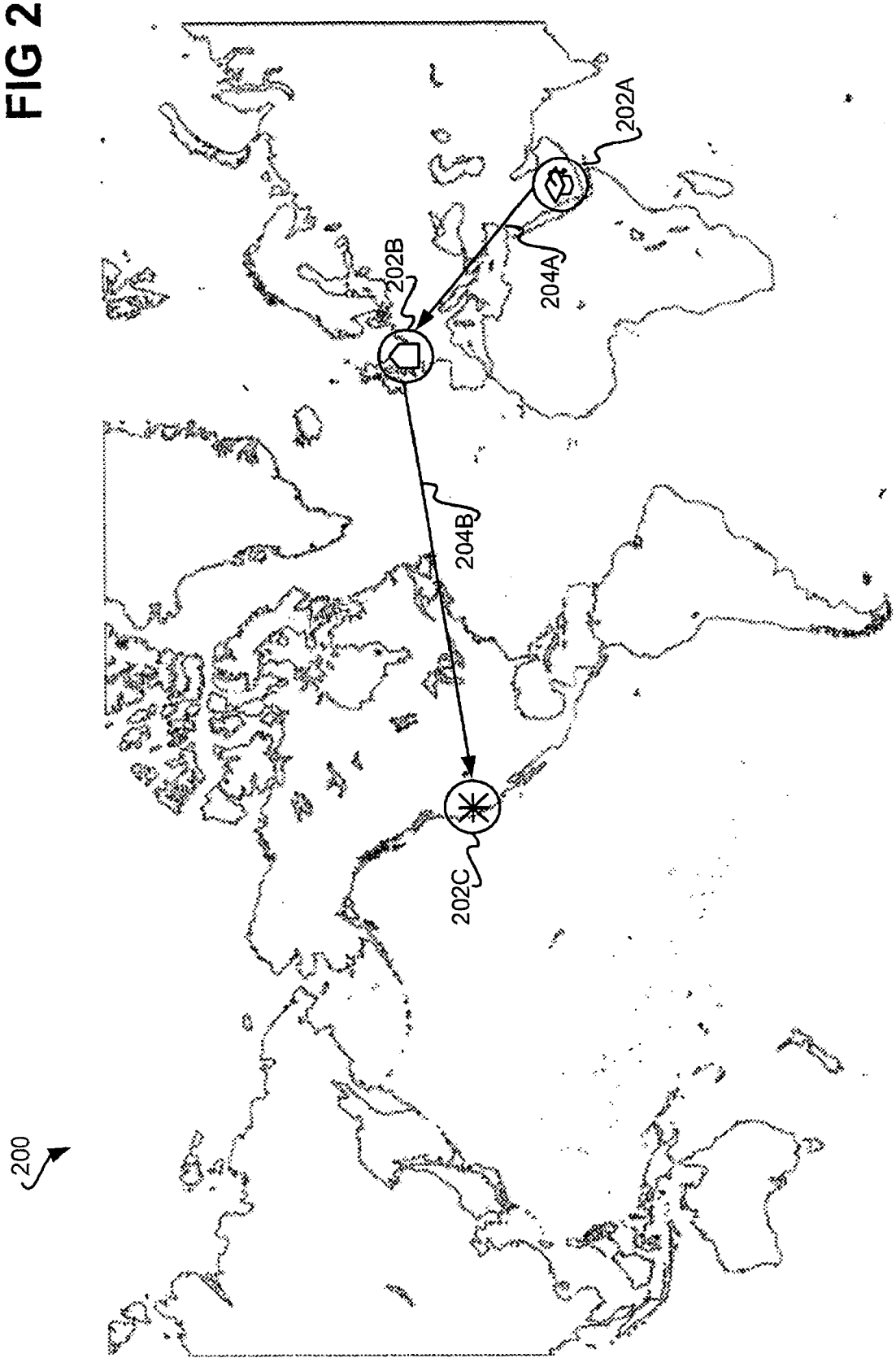
FIG. 2 is a diagram of a first representative display of information, according to an embodiment of the invention.

FIG. 2 shows a first representative display of the complex events 108 in a spatial and temporal manner on the display 102 by the logic 106, according to an embodiment of the invention. The logic 106 displays a map 200 encompassing the locations of the complex events 108. The map 200 is particularly a map of the entire world. However, interactivity may be provided by which the user is able to zoom in and out of this map, so that various locations on the map 200 are displayed in detail on the display 102, as can be appreciated by those of ordinary skill within the art.

The logic 106 first denotes on the display the location of each complex event by an icon corresponding to the type of the complex event. For example, consider three different complex events corresponding to an educational complex event in Bangalore, India from September 1999 through May 2003, a residential complex event in London, England from June 2003 through August 2003, and an employment complex event in Palo Alto, Calif. from August 2003 through May 2006. The logic 106 displays icons 202A, 202B, and 202C, collectively referred to as the icons 202, corresponding to these complex events.

Therefore, the icon 202A is located on the map 200 at Bangalore, India, the icon 202B is located on the map 200 at London, England, and the icon 202C is located on the map 200 at Palo Alto, Calif. The icons 202 have shapes or otherwise correspond to the types of the complex events. Thus, the icon 202A is of a graduation cap symbolizing an educational complex event, the icon 202B is of a house symbolizing a residential complex event, and the icon 202C is of a large asterisk symbolizing an employment complex event.

Furthermore, the icons 202 may be displayed in a color corresponding to whether their complex events are validated or not validated. For example, displaying an icon in green may denote that the corresponding complex event has been or is validated. By comparison, displaying an icon in red may denote that the corresponding complex event is not validated.

The logic 106 also draws lines between successive complex events for which icons have been displayed on the map 200. That is, for each pair of successive complex events, a line is drawn between the first complex event of the pair and the second complex event of the pair. In FIG. 2, for example, a line 204A has been drawn between the icons 202A and 202B, and a line 204B has been drawn between the icons 202B and 202C.

Successive complex events may be those that occur by date successively. Thus, the icon 202A corresponds to a complex event occurring between September 1999 and May 2003, whereas the icon 202B corresponds to a complex event occurring between June 2003 and August 2003. Because the former complex event is successive by date to the latter complex event, the line 204A is drawn from the icon 202A to the icon 202B. Similarly, the icon 202B corresponds to a complex event occurring between June 2003 and August 2003, whereas the icon 202C corresponds to a complex event occurring between August 2003 and May 2006. Because the former complex event is successive by date to the latter complex event, the line 204B is drawn from the icon 202B to the icon 202C.

Interactivity is provided for in the display of the map 200. Thus, a user may click or otherwise select a given icon to receive full information regarding the complex event represented by that icon. A user may click on or otherwise select a line to receive full information regarding the two complex events connected by that line. Other types of interactivity may also be provided for within the display of the map 200.

Figure 3:
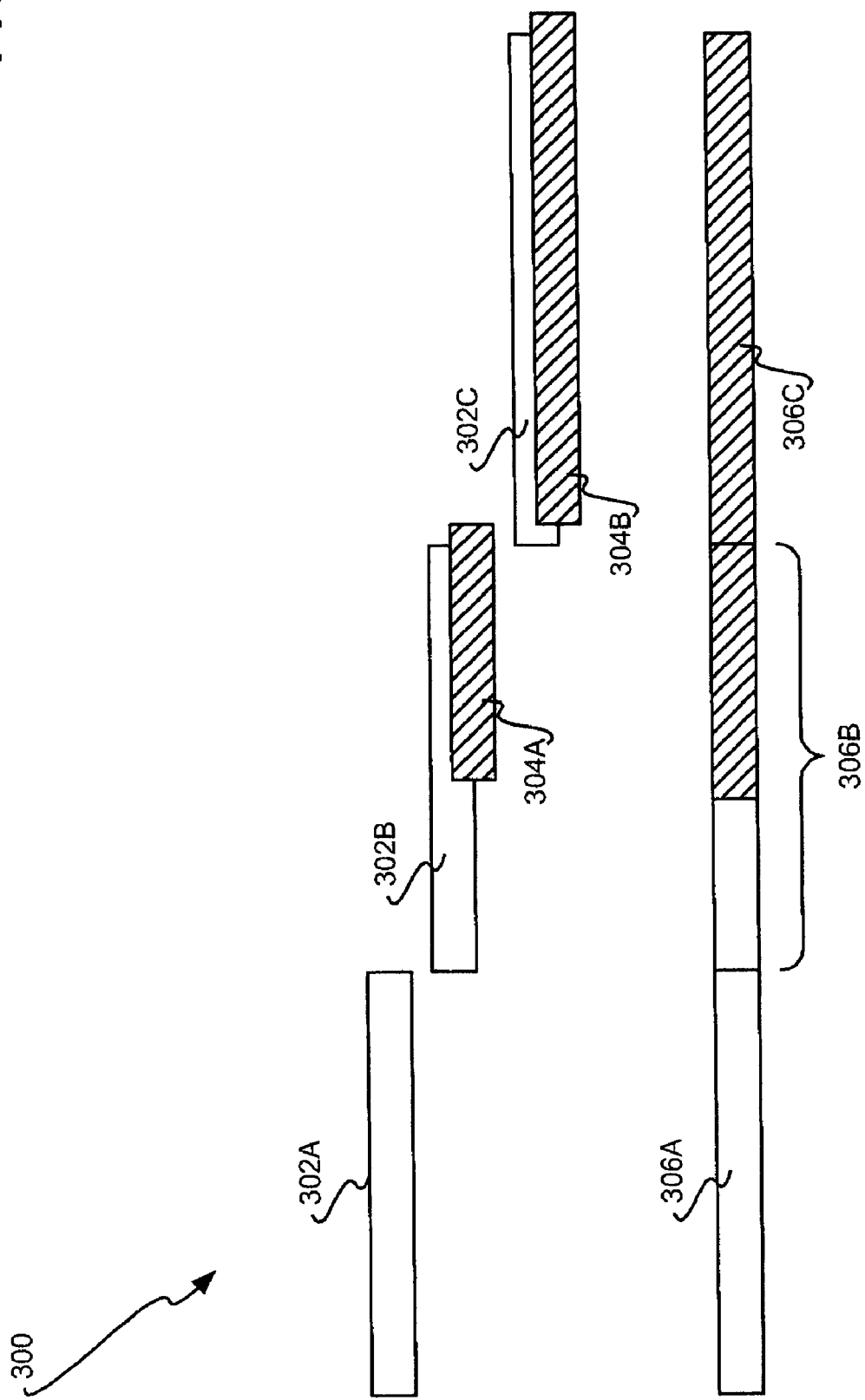
FIG. 3 is a diagram of a second representative display of information, according to an embodiment of the invention.

FIG. 3 shows a second representative display of the complex events 108 in a spatial and temporal manner on the display 102 by the logic 106, according to an embodiment of the invention. The logic 106 displays a diagram 300 including a number of timelines. The diagram may be displayed in the same or different window as the map 200 of FIG. 2. For instance, the diagram 300 may be displayed to the bottom of the map 200 of FIG. 2. In particular, there are three timelines in FIG. 3: a first timeline including timeline components 302A, 302B, and 302C, referred to as the components 302; a second timeline including timeline components 304A and 304B, referred to as the components 304, and a third timeline including timeline components 306A, 306B, and 306C, referred to as the components 306.

The first timeline may correspond to those complex events that were collected or gathered from the same source of information. For example, the timeline components 302 may correspond to complex events gathered from an individual's resume or employment application. The components 302 may correspond to the complex events represented by the icons 202 displayed on the map 200 of FIG. 2. Thus, the component 302A corresponds to an educational complex event, the component 302B corresponds to a residential complex event, and the component 302C corresponds to an employment complex event.

Overlaid on the first timeline is the second timeline, which may correspond to those complex events that have been validated, regardless of the source of information of these complex events. For example, the timeline component 304A may correspond to the complex event represented by the icon 202B displayed on the map 200 of FIG. 2, but where the date field of this complex event is inconsistent in the verified version as compared to that provided by the individual him or herself This is why the component 304A is shorter in length than the corresponding component 302B of the first timeline. The individual reported a longer length of time than that which was verified for this complex event.

By comparison, the timeline component 304B completely corresponds to the same complex event represented by the icon 202B displayed on the map 200 of FIG. 2 as does the timeline component 304A. The components 304A and 304B are of the same length, indicating that the date field of the complex event in question has been validated. It is also noted that the timeline component 304A of the first timeline has not been validated at all, insofar as there is no corresponding component within the second timeline.

Therefore, a user viewing the first and the second timelines can quickly discern two facts. First, the user can discern that the complex event corresponding to the timeline component 302A, as gathered from the individual's resume or employment application, has not been verified. Second, the user can discern that the complex event corresponding to the timeline component 302B has only been partially verified, as denoted by the shorter-in-length timeline component 304A. In particular, there is a discrepancy within the dates reported by the individual as compared to the validated dates received from a different source of information.

Finally, the third timeline, made up of the timeline components 306A, 306B, and 306C, is a composite timeline denoting all the complex events from all the data sources. The components 306A, 306B, and 306C correspond to the complex events represented by the icons 202 displayed on the map 200 of FIG. 2. The timeline component 306A is in one color, or is not shaded, similar to the timeline components 302, to indicate that the information of this complex event originates from the individual him or herself, and has otherwise not been validated. The timeline component 306C, by comparison, is in another color, or is shaded, similar to the timeline component 304B, to indicate that the information of this complex event has indeed been validated.

The timeline component 306B, however, includes shaded and unshaded portions in the example of FIG. 3. The timeline component 306B corresponds to the timeline components 302B and 304A. As such, the timeline component 306B is partially shaded to indicate only those dates of the corresponding complex event(s) that have been validated. That is, the individual has reported dates corresponding to the length of the timeline component 302B, whereas the verified dates corresponding to a shorter length of time of the timeline 304A. Therefore, a user viewing the timeline 306 can quickly conclude that there is a discrepancy between the information reported by the individual, and the extent to which that information has been validated.

Interactivity may further be provided for in the display of the timelines in FIG. 3. A user may select one of the timeline components 302, 304, and 306 to learn the details of the complex event(s) to which the component in question corresponds. The user may further be able to manipulate which timelines are actually displayed. For instance, the user may cause just the timelines for one or more different sources of information be displayed, or the user may cause just the timelines for validated information be displayed, and so on. As such, the user is in control as to which information is reflected by the display of the timelines.

FIG. 4 shows a third representative display of the complex events 108 in a spatial and temporal manner on the display 102 by the logic 106, according to an embodiment of the invention. The logic 106 displays a list 400 of the complex events 108. The list 400 may be displayed in the same or different window as the map 200 of FIG. 2 and/or the diagram 300 of FIG. 3. For instance, the list 400 may be displayed to the right of the map 200 of FIG. 2 in one embodiment.

In the example of FIG. 4, the list 400 contains list items 402A, 402B, and 402C, collectively referred to as the list items 402. The list items 402 correspond to the complex events 108. The list items 402 of the list 400 may be organized based on the types of the complex events 108. In addition, or alternatively, the list items 402 of the list 400 may be organized based on the dates, the locations, and so on.

The list items 402 in the example of FIG. 4 particularly depict the example complex events that have been described in relation to FIGS. 2 and 3. Thus, the list item 402A corresponds to a first complex event in which the individual in question attended an educational institution in Bangalore, India. The list item 402A is preceded by the icon 202A that is displayed on the map 200 of FIG. 2. The icon 202A in FIG. 4 may be displayed in one color, such as green, if its corresponding complex event is validated, and another color, such as red, if the complex event is not validated. The list item 402A includes complete information regarding the corresponding complex event, listing, for instance, that the individual received a Bachelor's in Electrical Engineering from Big University in Bangalore, India.

The list item 402B corresponds to a second complex event in which the individual in question resided in London, England. The icon 202B in FIG. 4 may be displayed in a color in accordance with whether the corresponding complex event is validated or not. The list item 402B includes complete information regarding the corresponding complex event, listing, for instance, that the individual resided at 12345 Cherry Lane in London, England.

The list item 402C corresponds to a third complex event in which the individual in question worked in Palo Alto, Calif. The icon 202C in FIG. 4 may be displayed in a color in accordance with whether the corresponding complex event is validated or not. The list item 402C includes complete information regarding the corresponding complex event, listing, for instance, that the individual worked at ABC Company as a technical specialist.

The displays of information in FIGS. 2, 3, and 4 can be synchronized with one another. For instance, if the user zooms in on a portion of the map 200 in FIG. 2, then the diagram 300 of FIG. 3 may display the timelines for the complex events represented by icons displayed in this map portion. As another example, if the user selects a given complex event in FIG. 2 or FIG. 3, the corresponding list item may be displayed in FIG. 4. Other types of synchronization can also be implemented.

Figure 5:
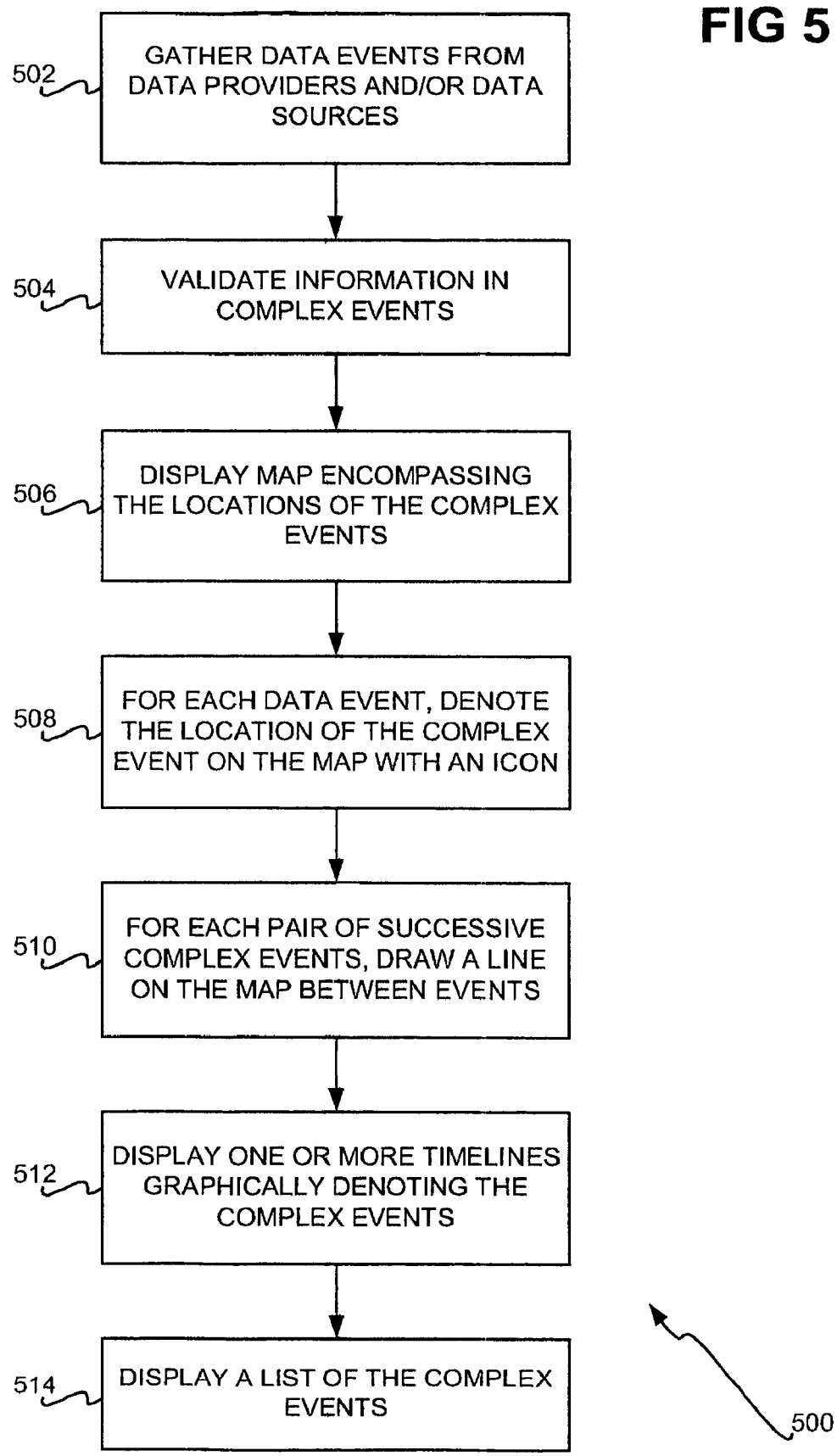
FIG. 5 is a flowchart of a method, according to an embodiment of the invention.

FIG. 5 shows a method 500 summarizing the display of information that has been described. The method 500 may be performed by the logic 106 of the system 100 of FIG. 1, in relation to the complex events 108 stored on the computer-readable medium 104, and in relation to the display 102. The method 500 is thus described in relation to FIG. 1. It is further noted that while the method 500 is depicted in FIG. 5 in a sequential manner, the graphical viewing that has been described can be activated at any time, such that the user is able to view a real-time scenario of the complex events validation. In other words, results rendering does not necessarily have to occur after validation, but can occur at any time.

The complex events 108 are gathered from one or more sources 114 (502), such as, for instance, as is conventional. The complex events 108 are each validated (504), such as, for instance, as is conventional. (That is, the information within the complex events is validated.) Validation of a complex event determines whether the complex event as provided by a given source is accurate or not. Thus, validation of a complex event may be considered verification of that complex event.

Thereafter, the map 200 is displayed on the display 102 that encompasses the locations of the complex events 108 (506). For each complex event, the location of the complex event is denoted on the map 200 displayed on the display 102 with a corresponding icon (508). The icon may correspond to the type of the event of the complex event in question, in a color corresponding to whether the complex event has been validated or not. Next, for each pair of successive complex events, a line is drawn on the map 200 between the complex events (510).

One or more timelines may be displayed on the display 102 that graphically denote the complex events 108 in the order of their dates (512). Some of the timelines may each correspond to or encompass those complex events that have been gathered from the same source. One of the timelines may correspond to or encompass those complex events that have been validated. A list of the complex events 108 may also be displayed on the display 102 (514). The list may be organized in accordance with the types into which the complex events can be categorized.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof

We claim:

1. A method for generating a spatial and temporal graphical display of complex events related to an employee's, prospective employee's, or company's background or history, the method comprising:
    gathering data related to a plurality of complex events regarding an employee's, prospective employee's, or company's background or history from one or more data sources and/or data providers, each complex event comprising an event of the employee's, prospective employee's, or company's background or history, a location of the event, and a date during which the event occurred;
    storing said data in a computer readable medium;
    using computerized logic to display on a display a spatial and temporal graphical map encompassing the locations and dates of the complex events based on the stored data;
    for each complex event, denoting on the display the location of the complex event on the map and the date during which the event occurred; and,
    for each of one or more pairs of successive complex events within the plurality of complex events, the pair including a first complex event and a second complex event, drawing on the display a line on the map between the location of the first complex event and the location of the second complex event;
    so as to generate a spatial and temporal graphical display of complex events related to the employee's, prospective employee's, or company's background or history.

2. The method of claim 1, wherein denoting the location of the event on the map comprises denoting the location of the event on the map with an icon corresponding to a type of the event.

3. The method of claim 1, further comprising validating each complex event to determine whether the complex event is accurate.

4. The method of claim 3, wherein denoting the location of the event on the map comprises denoting the location of the event on the map in a color corresponding to whether the complex event has been validated or not.

5. The method of claim 1, further comprising displaying on the display one or more timelines graphically denoting the complex events in order of the dates of the complex events.

6. The method of claim 5, wherein each of said one or more timelines corresponds to a different source of the complex events, such that the complex events from a same source are graphically denoted within a same timeline.

7. The method of claim 5, further comprising validating each complex event to determine whether the complex event is accurate,
    wherein one of the timelines corresponds to those of the complex events that have been validated.

8. The method of claim 1, further comprising displaying on the display a list of the complex events.

9. The method of claim 8, wherein the list is organized in accordance with a plurality of types into which the complex events are categorizable.

10. A computerized system for generating a spatial and temporal graphical display of complex events related to an employee's, prospective employee's, or company's background or history, the system comprising:
    a display;
    a computer-readable medium storing data related to a plurality of complex events regarding an employee's, prospective employee's, or company's background or history gathered from one or more sources, each complex event comprising an event of the employee's, prospective employee's, or company's background or history, a location of the event, and a date during which the event occurred; and,
    logic to display on the display a map encompassing the locations of the complex events, to, for each complex event, denote on the display the location of the complex event on the map, and to, for each of one or more pairs of successive complex events within the plurality of complex events, the pair including a first complex event and a second complex event, draw on the display a line on the map between the location of the first complex event and the location of the second complex event; so as to generate a spatial and temporal graphical display of complex events related to the employee's, prospective employee's, or company's background or history.

11. The system of claim 10, wherein each complex event is one of validated and unvalidated, and the logic is to denote on the display the location of each complex event on the map with an icon corresponding to a type of the complex event and in a color corresponding to whether the complex event is validated or unvalidated.

12. The system of claim 10, wherein each complex event is one of validated and unvalidated, and the logic is further to display on the display a plurality of timelines graphically denoting the complex events in order of the dates of the complex events, including a first timeline corresponding to those of the complex events that are validated, and one or more second timelines each corresponding to the complex events that have been gathered from a same source.

13. The system of claim 10, wherein the logic is further to display on the display a list of the complex events, the list organized in accordance with a plurality of types into which the complex events are categorizable.

14. A non-transitory computer-readable medium for generating a spatial and temporal graphical display of complex events related to an employee's, prospective employee's, or company's background or history, the medium having a computer program stored thereon to perform a method comprising:

gathering data related to a plurality of complex events regarding an employee's, prospective employee's, or company's background or history from one or more sources, each complex event comprising an event of the employee's, prospective employee's, or company's background or history, a location of the event, and a date during which the event occurred;

displaying on a display a map encompassing the locations of the complex events;

for each complex event, denoting on the display the location of the complex event on the map; and, for each of one or more pairs of successive complex events within the plurality of complex events, the pair including a first complex event and a second complex event, drawing on the display a line on the map between the location of the first complex event and the location of the second complex event;

so as to generate a spatial and temporal graphical display of complex events related to the employee's, prospective employee's, or company's background or history.

15. The non-transitory computer-readable medium of claim 14, wherein each complex event is one of validated and unvalidated, and the method is to denote on the display the location of each complex event on the map with an icon corresponding to a type of the complex event and in a color corresponding to whether the complex event is validated or unvalidated.

16. The non-transitory computer-readable medium of claim 14, wherein each complex event is one of validated and unvalidated, and the method further comprises displaying on the display a plurality of timelines graphically denoting the complex events in order of the dates of the complex events, including a first timeline corresponding to those of the complex events that are validated, and one or more additional timelines each corresponding to the specific information about the complex events that have been gathered from a same source.

17. The non-transitory computer-readable medium of claim 14, wherein the method further comprises displaying on the display a list of the complex events, the list organized in accordance with a plurality of types into which the complex events are categorizable.

18. A method for generating a spatial and temporal graphical display of complex events related to an individual's background or history, the method comprising:

gathering data related to a plurality of complex events regarding an individual's background or history from one or more data sources and/or data providers, each complex event comprising records of an event of the individual's background or history selected from one or more of tax records, employment records, criminal records, residential records, educational records, and accreditation records; a location of the event; and a date during which the event occurred;

storing said data in a computer readable medium;

using computerized logic to display on a display a spatial and temporal graphical map encompassing the locations and dates of the complex events based on the stored data;

for each complex event, denoting on the display the location of the complex event on the map and the date during which the event occurred; and, for each of one or more pairs of successive complex events within the plurality of complex events, the pair including a first complex event and a second complex event, drawing on the display a line on the map between the location of the first complex event and the location of the second complex event;

so as to generate a spatial and temporal graphical display of complex events related to the individual's background or history.

19. The method of claim 18, further comprising validating each complex event to determine whether the complex event is accurate.

20. The method of claim 19, wherein denoting the location of the event on the map comprises denoting the location of the event on the map in a color corresponding to whether the complex event has been validated or not.

21. The method of claim 18, further comprising displaying on the display one or more timelines graphically denoting the complex events in order of the dates of the complex events.

22. The method of claim 21, wherein each of said one or more timelines corresponds to a different source of the complex events, such that the complex events from a same source are graphically denoted within a same timeline.

23. The method of claim 21, further comprising validating each complex event to determine whether the complex event is accurate, wherein one of the timelines corresponds to those of the complex events that have been validated.

24. A computerized system for generating a spatial and temporal graphical display of complex events related to an individual's background or history, the system comprising:

a display;

a computer-readable medium storing data related to a plurality of complex events regarding an individual's or company's background or history gathered from one or more sources, each complex event comprising records of an event of the individual's background or history selected from one or more of tax records, employment records, criminal records, residential records, educational records, and accreditation records; a location of the event; and a date during which the event occurred; and, logic to display on the display a map encompassing the locations of the complex events, to, for each complex event, denote on the display the location of the complex event on the map, and to, for each of one or more pairs of successive complex events within the plurality of complex events, the pair including a first complex event and a second complex event, draw on the display a line on the map between the location of the first complex event and the location of the second complex event; so as to generate a spatial and temporal graphical display of complex events related to the individual's background or history.

25. The system of claim 24, wherein each complex event is one of validated and unvalidated, and the logic is to denote on the display the location of each complex event on the map with an icon corresponding to a type of the complex event and in a color corresponding to whether the complex event is validated or unvalidated.

26. The system of claim 24, wherein each complex event is one of validated and unvalidated, and the logic is further to display on the display a plurality of timelines graphically denoting the complex events in order of the dates of the complex events, including a first timeline corresponding to those of the complex events that are validated, and one or more second timelines each corresponding to the complex events that have been gathered from a same source.

27. The system of claim 24, wherein the logic is further to display on the display a list of the complex events, the list organized in accordance with a plurality of types into which the complex events are categorizable.

* * * * *